Figure 1:
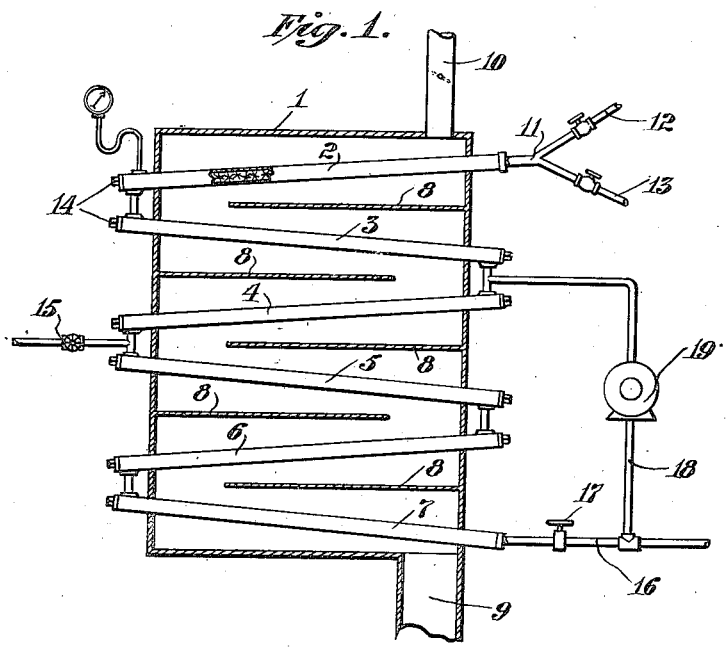

A. A. WELLS.
PROCESS OF DECOMPOSING OIL.
APPLICATION FILED MAR. 31, 1913.

1,232,454.

Patented July 3, 1917.

Attest:
Inventor:
Alfred A. Wells

UNITED STATES PATENT OFFICE.

ALFRED A. WELLS, OF MONTCLAIR, NEW JERSEY, ASSIGNOR TO ELLIS-FOSTER COMPANY, A CORPORATION OF NEW JERSEY.

PROCESS OF DECOMPOSING OIL.

1,232,454.      Specification of Letters Patent.      Patented July 3, 1917.

Application filed March 31, 1913. Serial No. 757,866.

*To all whom it may concern:*

Be it known that I, ALFRED A. WELLS, a citizen of the United States, and resident of Montclair, in the county of Essex and State of New Jersey, have invented certain new and useful Improvements in the Process of Decomposing Oil, of which the following is a specification.

This invention concerns a process of making light from heavy petrolic oils.

I have found that the decomposition of kerosene and other oils to make light products is promoted by certain conditions set forth below.

Heavy oils do not split up by heat in a controllable manner but many side reactions occur producing gases and coke or carbon deposits. My aim is to resolve such reactions into controllable form.

When say kerosene is passed through a tube heated to substantially 500° C., especially in the presence of water vapor, decomposition occurs and lighter oils are produced. If the heating takes place under pressure the reaction progresses more uniformly and I find the pressure is best varied with the nature of the oil, the kerosene requiring a higher pressure ordinarily than the heavier oils. I find that as a rule the pressure may be varied as the inverse squares of the gravity expressed in degrees Baumé. Or $$\frac{P}{G^2} = K$$

where G is the gravity in degrees Baumé, P the pressure and K a constant.

The use of water with oils in passing the same through a hot zone should be controlled with reference to the partial pressure of the oil and compensated for, the water preferably being increased in proportionate amount with increase in the gravity, that is the heavier the oil the greater quantity of water should be used. The ratio of oil to water varies approximately as the inverse squares of the gravity of the oil when denoted in degrees Baumé. From 10 to 50% of water may be used according to the quality of the oil. In some cases the water may be omitted especially where catalyzers sensitive to moisture are being used.

Condensation of the products that have passed through the hot zone may take place subsequently under pressure or in vacuum, preferably under atmospheric pressure.

Any gaseous product collected during condensation may be returned to the hot zone in order to produce a back pressure of gas tending to retard gas formation from the freshly added oil.

Air may be admitted to the heating zone but only in small amounts and so as not to give rise to combustion, which is undesirable, but merely to very slightly oxidize and aid in polymerizing olefins to stable bodies of a volatile nature. Olefins are undesirable in motor fuels as they tend to resinify in the carbureter. Due to polymerization the double bonds are destroyed and this product is rendered stable. When hydrogen is introduced in place of air, in the presence of a suitable catalyst the olefins are saturated to the corresponding paraffins. It is not essential that the olefins be completely saturated with hydrogen in order to obtain a stable product and I prefer to add only about half of the quantity necessary to complete such saturation.

A rapid transfer of heat to the mixture in the decomposing zone is desirable and the flow of the mixture may be regulated to keep its temperature at the point required for best conversion as shown by the formula heretofore given while the metal tubes, etc., inclosing the same may be heated much hotter. In this manner a large output is afforded with compact apparatus.

I have found that metal bodies of the shape of jackstones are desirable in tube heating, as these bodies pack in such a manner as to give a nearly clear space near the walls of the tube while the spaces decrease as the center is approached, thus giving greater baffling action in the center. These bodies may be made of cast iron plated with copper, or a mixture of copper and nickel, the latter being sometimes useful with heavy oils. Or other catalytic coating may be produced, such as the oxids of copper and cobalt.

By using close boiling fractions, that is, fractions boiling within narrow limits, such as well refined or fractionated kerosene I may operate so as to secure a yield of about 25-35% of light products distilling below 150° C. The light products are removed by distillation or dephlegmation and the residue is returned to the heating apparatus to be further decomposed. If the light fractions are not taken off before their percentage reaches a somewhat higher figure, they are more or less converted to fixed gases. This result is obtained by maintaining the furnace at such a temperature and passing the oil at such a rate that only about 30% of the heavier oil will be converted into the lighter products. If the oil is passed too slowly or if the temperature is allowed to become too great excessive amounts of gases will be formed. To secure the greatest amount of light products and minimum amount of gas, this consideration should be borne in mind, in addition to the foregoing specified conditions.

The drawings forming a part of this specification show a diagrammatic outline of an apparatus suitable for my purpose. In these drawings Figure 1 is a sectional elevation of the apparatus and Fig. 2 shows the preferred form of the heat conducting and catalyzing material.

Figure 2:
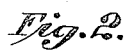

In Fig. 1, 1 is a chamber having the tubes 2, 3, 4, 5, 6 and 7 between which are baffles 8, 8. 9 is an inlet for hot gases and 10 a flue. 11 is the mixture inlet pipe having the oil branch 12 and water branch 13. 14 is a plug to admit catalyzer. 15 is a pipe for admitting air or oxygen or other gas such as hydrogen. 16 is a discharge pipe having a valve 17. 18 is a gas return pipe provided with the pump 19. Fig. 2 shows the jackstone formation of the heat conducting element. This may be made of iron with a copper coating. Usually the diameter of this element is not greater than one half the diameter of the tube in order to secure the peculiar baffling effect increasing toward the center of the tube.

The operation of the apparatus in carrying out my process is as follows:—Illustratively take kerosene of a gravity of 45 Baumé. This may be entered by the pipe 12 at a given rate while water in the proportion of substantially one part of water to ten parts of oil enters by the pipe 13. These mix at 11 and pass into the preheating pipes in the upper part of the chamber which are usually maintained at 360-370° C. Here initial decomposition to some extent takes place and the preheated mixture advances into the lower tubes which are kept at a temperature of 500-525° C., that is to say, the mixture passing through the same is held at about that point. The products withdrawn at 16 should contain 25% or over of products boiling under 150° C. For kerosene of this gravity the pressure is maintained at 243 lbs. in which case the constant K. is .12.

Formula—

$$\frac{P}{G^2} = K.$$

*Example I.*

G = 22° B.
K = .12

$$\frac{P}{(22)^2} = .12$$

P = 60 lbs. working pressure.

*Example II.*

G = 45° B.
K = .12

$$\frac{P}{(45)^2} = .12$$

P = 243 lbs. working pressure.

22° B. oil is the gravity of residuum still bottoms and can be decomposed at slightly above its boiling point hence it does not require a very great pressure to keep it from boiling at the temperature of decomposition of about 400-450° B. On the other hand 45° B. corresponds to ordinary kerosene which is not decomposed at its boiling point, which is between 200 and 300° C., but must be heated to about 500° C., or somewhat higher in order to bring about successful decomposition. Therefore the pressure must be much greater than is the case when the heavier products are used.

These light products are removed and the heavier residue mixed if desired with fresh kerosene is returned to 12.

What is claimed herein is:—

1. The process of making light from heavy fractions of petroleum, which comprises passing the vapors of the heavy oil with water through a heated zone baffled with pronged metallic bodies, and in withdrawing said vapors and condensing same.

2. The process of making light from heavier petroleum oils which comprises passing the heavier oil together with water through a heated zone baffled with structures of such a shape that a greater baffling effect is secured in the center than at the exposed surfaces of said heated zone, in withdrawing said vapors and condensing same.

3. The process of making light from heavy hydrocarbons which comprises passing the vapors of the heavy oil through a heated zone baffled with metallic pronged bodies, whose surface is coated with a catalytic material, in withdrawing the vapors and condensing same.

4. In the process of making lighter from heavier petroleum oils by passing the vapors of the heavier oil through a heated zone the step which comprises baffling the heated zone with pronged metallic bodies whereby a greater baffling effect is secured in the center of the passage than at the exposed surfaces thereof.

5. In the process of converting heavy petroleum oils into lighter bodies by passing the heavy oil vapors through a heated baffled zone, the step which comprises baffling the heated zone with pronged metallic bodies whose surfaces are coated with catalytic material, whereby a greater baffling effect is secured in the center of the passage than at the exposed surfaces thereof.

6. The process of making light gasolene material from heavier petroleum oil which comprises passing the vapors of the heavier oil of predetermined gravity through a heated zone baffled with pronged metallic bodies, at a pressure corresponding to the formula $$\frac{P}{G^2}=K,$$

in which P equals pressure, G equals gravity in degrees Baumé and K is a constant, in removing said vapors and condensing same.

7. The process of making light products from heavier petroleum oils which comprises passing the heavier oil through a heated zone containing baffles, the arrangement of said baffles being such that a baffling effect in the center of said zone greater than that at the exposed surfaces of said zone is secured.

8. In the process of converting heavier petroleum oils into lighter bodies by passing the heavier oil vapors through a heated baffled zone, the step which comprises baffling the heat zone with metallic bodies whereby a baffling effect in the center of the passage greater than that at the exposed surfaces thereof is secured.

9. The process of making gasolene material from heavier petroleum oil which comprises passing the vapors of the heavier oil of predetermined gravity through a heated zone in extensive contact with metallic surfaces at a pressure corresponding to the formula $$\frac{P}{G}=K$$

where P equals the pressure, G the gravity in degrees Baumé and K is a constant, in removing the products of decomposition and in condensing the gasolene material.

10. The process of making gasolene material from heavier petroleum oil which comprises passing the vapors of the heavier oil of predetermined gravity through a cracking zone baffled with metallic bodies having heat conducting properties, while maintaining the pressure at a point corresponding to the formula $$\frac{P}{G}=K$$

where P is the pressure, G the gravity in degrees Baumé and K is a constant; in removing the products of heat decomposition and in condensing the condensable material therefrom.

Signed at Montclair, in the county of Essex and State of New Jersey, this 29th day of March A. D. 1913.

ALFRED A. WELLS.

Witnesses:
I. DAVID LUBETZKI,
ELIZABETH M. MARTIN.